United States Patent [19]

Kainuma

[11] 4,270,875

[45] Jun. 2, 1981

[54] METHOD OF CREATING LANDFILL FROM RED MUD

[75] Inventor: Akio Kainuma, Tomakomai, Japan

[73] Assignee: Nippon Light Metal Company Limited, Tokyo, Japan

[21] Appl. No.: 155,951

[22] Filed: Jun. 3, 1980

Related U.S. Application Data

[63] Continuation-in-part of Ser. No. 960,018, Nov. 13, 1978, abandoned.

[30] Foreign Application Priority Data

Apr. 24, 1978 [JP] Japan .................................. 53/47887

[51] Int. Cl.[3] ............................ B09B 5/00; G21F 9/00

[52] U.S. Cl. ...................................... 405/129; 405/271

[58] Field of Search .................. 100/37; 405/128, 129, 405/258, 268, 270, 271; 166/292; 423/121, 122; 210/66

[56] References Cited

U.S. PATENT DOCUMENTS

| | | | |
|---|---|---|---|
| 2,768,120 | 10/1956 | Rietema | 210/66 X |
| 2,904,835 | 9/1959 | Thomas | 100/37 X |
| 3,714,792 | 2/1973 | Murphy et al. | 423/122 X |
| 3,852,967 | 12/1974 | Stewart et al. | 405/128 |

FOREIGN PATENT DOCUMENTS

| | | | |
|---|---|---|---|
| 51-6868 | 1/1976 | Japan | 423/122 |
| 407998 | 4/1974 | U.S.S.R. | 405/258 |

OTHER PUBLICATIONS

Kirk-Othmer Encyclopedia of Chemical Technology, vol. 21, Second Edition, 1968, pp. 648–649.

*Primary Examiner*—James A. Leppink
*Assistant Examiner*—George A. Suchfield
*Attorney, Agent, or Firm*—William J. Daniel

[57] ABSTRACT

This invention relates to a method of using "red mud", i.e., slurry by-products from the Bayer process for extracting alumina from bauxite, for creating landfill. The red mud is first filtered to reduce its water content in the conventional manner and then mechanically compressed and dewatered until it has a void ratio less than 1.5, preferably, 1.0 to 1.5, and has the form of solid cakes or other bodies. The red mud cakes are easy to handle and are useful as a landfill material for reclaiming land when applied with light tamping or compacting.

4 Claims, 2 Drawing Figures

FIG. I

METHOD OF CREATING LANDFILL FROM RED MUD

The present application is a continuation-in-part of patent application Ser. No. 960,018, filed Nov. 13, 1978, now abandoned.

BACKGROUND OF THE INVENTION

1. Field of the Invention

This invention relates to a method of using for landfill purposes red mud which is a by-product in the Bayer process of separating alumina from bauxite.

2. Description of the Prior Art

In the Bayer process natural bauxite ore is treated in an alkali solution by heating under pressure to extract the alumina content in solution. In this step, a considerable amount of insoluble residues is released from the bauxite and remain as a "waste" by-product. These residues are commonly known as "red mud" and include fine particles of iron oxides, sodium aluminosilicates, titanium oxides, quartz, etc. The separation and disposal of the red mud from the aluminate liquor is a difficult aspect of the Bayer process.

Thus, because of the fact that red mud consists of very fine particles, a long time is required for settling and separation, using a thickener or the like. The separated red mud is a thick, muddy slurry which contains a considerable amount of alumina and alkali and to recover these valuable components multi-stage washing with a series of thickeners or the like is required. Further, red mud after the washing treatment is in the form of a slurry which still contains some alkali, so that resort to a slurry pump for transporting it from the plant to a disposal site is practically inevitable. The disposal site must be completely enclosed or dammed by an embankment or levee from the standpoint of preventing leakage of the red mud slurry and thus protecting the environment. As the red mud must ordinarily be transported by a slurry pump, the disposal site must be conveniently near to the plant or factory at which it is produced.

It has, of course, been long known to utilize industrial and household waste as a landfill material for reclaiming land which for any of a variety of reasons is unsuited for productive or even recreational purposes. Past attempts to use the recovered red mud in this way have proved unsuccessful. The red mud slurry is very weak and requires in mechanical strength at least several weeks of open exposure before it becomes capable of supporting the weight of humans without danger even in a region having little rainfall. Furthermore, heavy vehicles can never enter such an area, so that it cannot be directly used for construction purposes. (See for example, "Dewatering Large Volume Aqueous Slurries: Sand Bed Filtration of Bauxite Residue" by Vogt, M. E., Stein, D. L., A.I.M.E. Symposium in Las Vegas, Nev. (1976).)

SUMMARY OF THE INVENTION

It has been discovered that the afore-mentioned problems in the utilization for creating landfill of red mud produced in the Bayer process of manufacturing alumina are avoided if the red mud is properly treated in advance of such utilization. Thus, if the red mud, preferably after conventional filtering, is compressed and dewatered into a solid cake having a void ratio of less than 1.5, ordinarily between 1.0 and 1.5, expressed in terms of the ratio of the total volume of the void space in the red mud cake to the net volume of the red mud particles in the cake alone, the resultant cakes or bodies have greatly improved mechanical character and can be handled during transportation and the like in the same way as with ordinary earth and sand for disposal and storage. Also, it has been found that a landfill of acceptable structural strength can be formed with such red mud cake by transporting it to and piling it up in a suitable vacant area and applying slight tamping pressure, e.g. by rolling so that the landfill thus formed can be directly utilized as any other landfill or, if desirable, after merely covering with a very thin layer of earth and sand.

The invention thus features a practical method for utilizing red mud obtained by the red mud separation step in the Bayer method which has been bodily compressed and dewatered in advance of such use to the extent that the void ratio of the compressed body, expressed as the ratio of the total volume of the void in the red mud cake to the net volume of the red mud solids alone in the cake, is less than 1.5, and ordinarily between 1.0 to 1.5.

According to the invention, the red mud cakes when properly prepared according to the invention can be handled in the same way as ordinary earth and sand during transportation and handling and require no protective embankment or levee around the disposal area. Further, the red mud cakes after disposal are not liable to disintegration by absorbing water, and accumulated masses thereof can support travel by vehicles as well as by men and can be utilized as landfill by merely applying very light rolling pressure.

DETAILED DESCRIPTION OF PREFERRED EMBODIMENTS

The invention will now be described in further detail in connection with examples.

When red mud slurry obtained by separation with settling in the usual red mud separating and washing steps of the Bayer process is filtered in the usual way, through an ordinary filter, for instance a vacuum filter, wet red mud cake with water content of 45% is obtained. In this condition the red mud residue has a void ratio of 2.2 to 2.5, and is still viscous rather than solid and readily becomes fluid (i.e., similar to mud) with agitation. Thus, such mud residue is still difficult to handle and, of course, cannot be accumulated or collected without some kind of protective dam or embankment. Although the red mud produced in the Bayer process could in principle be treated according to the invention without the usual filtration step or steps, it is preferred to practice the usual filtration in order to remove as much water as can be conveniently achieved thereby and thus lessen the work having to be done during the bodily compression treatment.

When this filtered red mud residue, which is actually a form of slurry, is appropriately enclosed, e.g. loaded into filter sacks, and bodily compressed by a mechanical compressor, e.g., a compression chamber and a ram, or by a diaphragm compressed by pressurized water, the volume of the mud slurry is increasingly reduced as it undergoes compaction with increasing ram pressure or water pressure, reducing the water content and thus the void ratio, and becomes increasingly dewatered.

Figure 1:
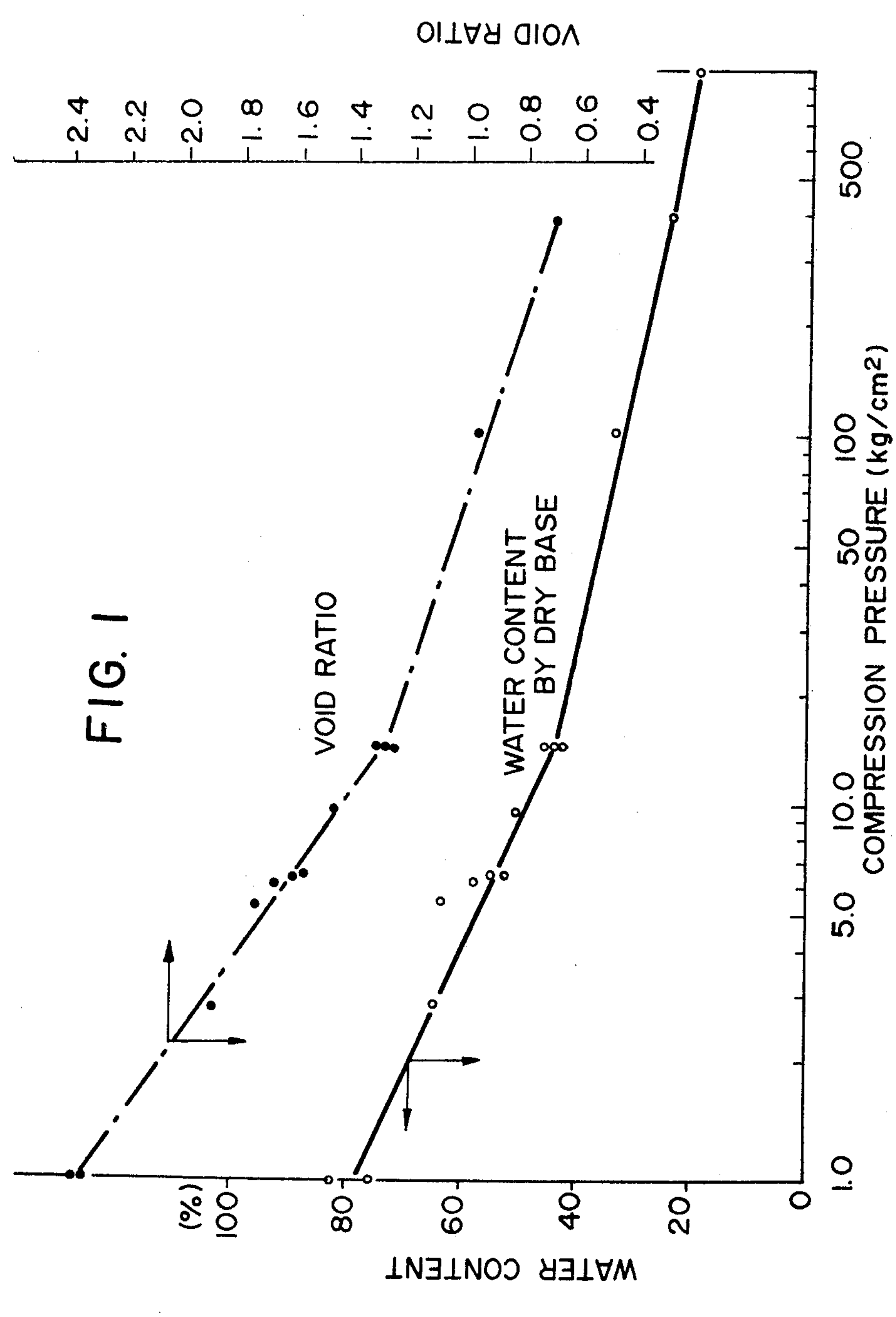
FIG. 1 is a graph showing the relationships of the void ratio as defined herein, and water content of the cake on a dry weight basis, to the bodily compression pressure.

FIG. 1 shows the relationship of the void ratio and the water content on a dry weight basis (i.e., percentage by weight of water contained in red mud cakes relative to the dry solids weight of the red mud cakes) to the magnitude of the bodily compression pressure.

As a result of experiments conducted by the inventor it has been found that if the void ratio is reduced to less than 1.5 by the bodily compression pressure, the water content of the compressed cake becomes less than about 50%, and at the same time its viscosity or fluidity is lost and the handling ability of the red mud cake is improved. Thus, the compressed cake can be heaped or piled like ordinary dirty and sand with a common shovel loader in any suitable place, either indoors or outdoors. In addition, red mud cake compressed to a void ratio of less than 1.5 thereafter absorbs almost no water and, when piled outdoors, is no longer liable to disintegration (i.e., re-slurrification) by rain water or the like. Further, it has been found that the heaped layer can be made into useful ground or fill having strong load-bearing capacity by applying a light compacting pressure to its surface with tire rollers or the like.

As stated above, the red mud cake must be bodily compressed to an extent that the void ratio is less than 1.5 as mentioned above; however, excessive bodily compression results in a water content below that which is optimum for subsequent use as a landfill, which is undesirable from the standpoint of handling as well as dewatering cost. Accordingly, the void ratio after compression ordinarily ranges from 1.0 to 1.5.

The following Table 1 shows the correlation between the void ratio of the compressed cake and the water content thereof, expressed both as a weight percentage of the wet cake and as a weight percentage of the dry solids content of the cake, the dry density of the red mud solids being taken as 2.9 gm/cm$^3$.

TABLE 1

| Water content % | | |
|---|---|---|
| As % of wet cake | As % of dry solids | Void ratio |
| 23.1 | 30 | 0.87 |
| 25.93 | 35 | 1.01 |
| 28.57 | 40 | 1.16 |
| 33.3 | 50 | 1.45 |
| 37.5 | 60 | 1.73 |
| 41.2 | 70 | 2.03 |

Results of several tests carried out by the inventor to illustrate the results of the invention are shown below.

1. Water immersion test

Red mud cakes after the usual filtering were bodily compressed by a compressor with a pressure of 12 kg/cm$^2$ to obtain compressed cakes having a void ratio of 1.24 and a water content of 31.1% on a wet basis (45.1% on a dry basis) and were then completely immersed in water to measure their water absorptivity. Table 2 below shows the change in water content in the resultant red mud cakes with time when completely immersed in water.

TABLE 2

| Period of immersion in water (in hours) | 0 | 24 | 96 | 192 | 288 |
|---|---|---|---|---|---|
| Water content (in % wt on a wet basis) | 31.1 | 31.6 | 31.9 | 31.9 | 31.9 |
| Water content (in % wt on a dry basis) | (45.1) | (46.2) | (46.8) | (46.8) | (46.8) |

It will be seen from the above results that the compressed red mud cakes absorb almost no water even after 12 days immersion. This means that when the cakes are spread or piled up outdoors in the same way as ordinary dirt and sand, they do not disintegrate when exposed to rain water of normal rainfall.

2. Outdoor piling up test

Compressed red mud cake masses obtained in the previous test (1) were loaded on a drump truck with a shovel loader, dumped from the dump truck onto the ground and then piled up (heaped) to a height of 2.5 m with the shovel loader. For this operation, the red mud cakes after bodily compression were first crushed to provide a grain size distribution ranging from the largest grain size of 100 mm to several mm.

The crushed particles did not adhere together and could be smoothly handled in the same way as ordinary dirt and sand. The bulk density of the thus formed layer was 1.58 g/cm$^3$, and the dry weight of crushed red mud cake particles was 1.1 tons/m$^3$.

It was observed that rain water did not flow away as surface water but when the amounts were small was retained in surface depressions in the pile and eventually evaporated.

Figure 2:
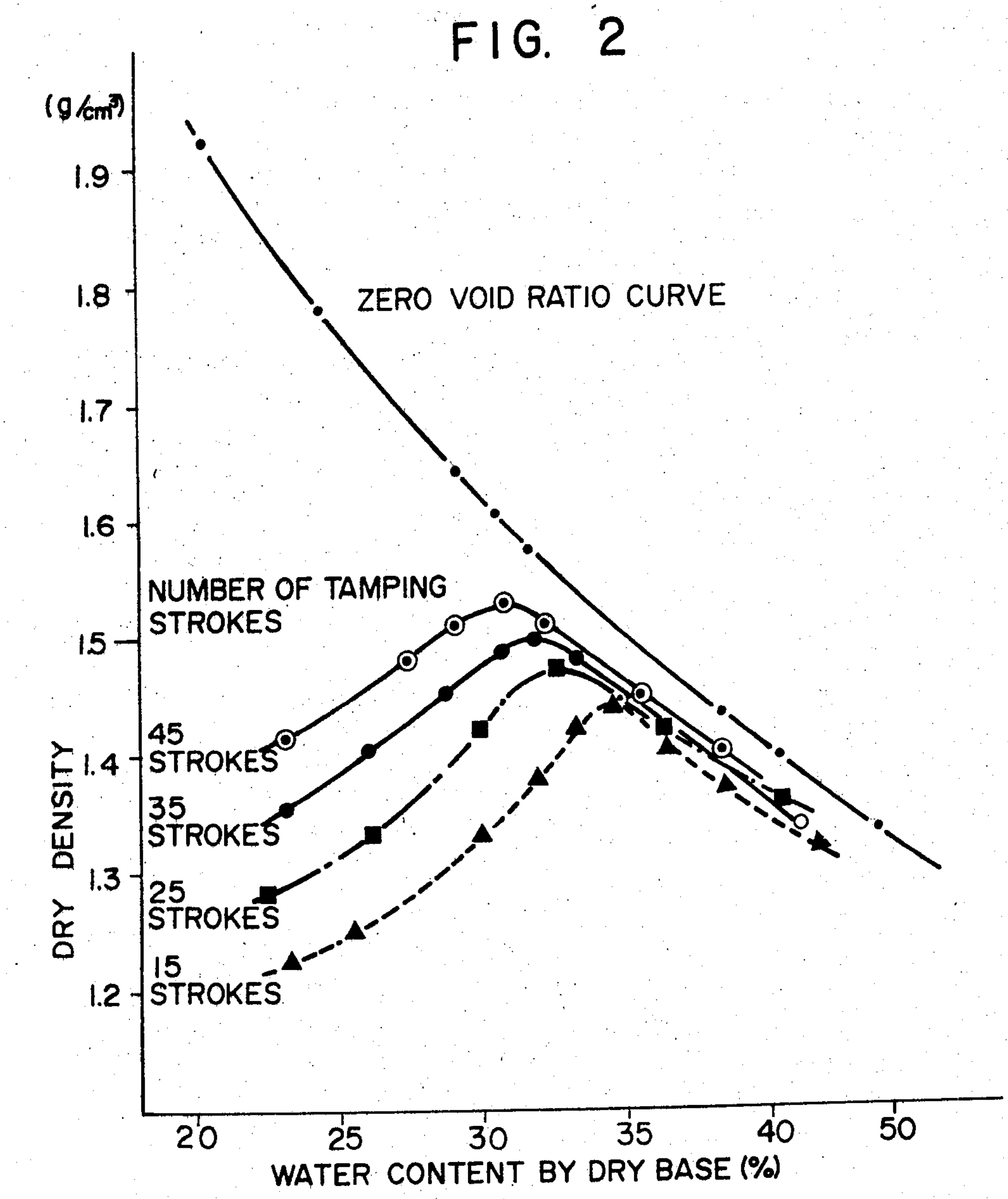
FIG. 2 is a graph showing curves of the relationship of subsequent mechanical tamping and dry density when landfill formed of the bodily compressed red mud cake of the invention is tamped as in test 2 hereafter, as a function of a range of water content of the cakes used therein, the water content being expressed as a percentage of the dry weight of the cakes and compared to the theoretical zero air void curve over the same water content range.

In order to form a landfill from such compressed red mud cakes, the inventor conducted a compaction characteristics test according to the test method for compaction by tamping in JIS A 1210 (substantially corresponding to ASTM D698-78) on the compressed red cake bodies, varying the number of tamping strokes to obtain curves representing the relationship between the water content as a percentage of the dry mud solids and the dry density, as shown in FIG. 2.

As is seen from the above results in FIG. 2, maximum dry density is obtained when the water content is about 30% (corresponding to a void ratio of 0.8) and the extent of tamping is 45 strokes, and as the water content (that is, void ratio) increases above this value, the dry density approaches zero air void ratio curve (i.e., the "saturation" curve) at which any voids present are filled with water not air, without being influenced by, i.e. independently of, the number of tamping strokes. Particularly, with a water content in excess of about 35% (corresponding to a void ratio of 1.0) accumulations, e.g. heaps, of bodily compressed red mud cake can be converted into a dense and compact condition free from air voids easily by a simple light compacting operation, without excessive amounts of tamping since tamping in excess of about 15 tamping strokes does not produce substantial improvement in dry density.

The above-mentioned zero air void ratio curve indicates the state wherein air is expelled from the red mud by repeating the tamping so that no air void is left in the red mud cake. The cake having zero air void consists of water content and red mud particles. Therefore, the dry density is changed according to the change in the water content.

From the results of the above experiments, it can be concluded that the characteristics of the bodily compressed red mud cake is particularly suitable for landfill purposes with compaction thereof with rolling pressure when its void ratio ranges from 1.0 to 1.5.

Now, the characteristics of the earth, e.g., landfill, obtained by piling and compacting the properly compressed red mud cake of the invention will be demonstrated by actual test carried out in the following way.

Red mud slurry discharged from the final stage thickener in the red mud washing step of the Bayer process was compressed and dewatered under a pressure of 15 $kg/cm^2$ into plate-like red mud cakes having a void ratio ranging from 1.2 to 1.3 and a water content on a dry basis ranging from 42 to 45% and then piled up and compacted in two ways:

(A) The cakes were spread over an area of 100 $m^2$ to a thickness of 0.3 m, and the layer thus formed was then rolled once with a 3-ton class tire roller having an effective contact pressure of about 2.5 $kg/cm^2$. Then, another layer of red mud cake of the same thickness was spread over the previous one and rolled in the same way. This operation was repeated to form a bed or heap 3 m in overall thickness or depth.

(B) The cakes were laid over an area of 100 $m^2$ and to a thickness of 0.3 m, as before except that the layer thus formed was then rolled a couple of times with an 8-ton class tire roller having an effective contact pressure of about 4.2 $kg/cm^2$, and this operation was repeated until the bed had a thickness or depth of 1 m.

After formation of these two different beds (A) and (B) their water content, dry density and allowable bearing capacity as determined by the flat plate load test (one-half the yield load) were measured, and the results of the measurements are shown in Table 3 below.

TABLE 3

| Bed | Water content, dry basis | Dry density | Allowable bearing capacity |
|---|---|---|---|
| A | 36.5% | 1.35 $g/cm^3$ | 7.2 $t/m^2$ |
| B | 37.1% | 1.37 $g/cm^3$ | 17.6 $t/m^2$ |

It will be seen from the results shown in Table 3 that when the bed was formed, as in Test A, by very light rolling (rolling once with a 3-ton class tire roller) an allowable bearing capacity of 7 $t/m^2$ is obtained while a considerably higher bearing capacity of 17.6 $t/m^2$ is obtained when the bed was rolled with a heavy tire roller (rolling a couple of times with an 8-ton class tire roller).

The preparation of the red mud cake according to the invention has still another benefit.

Untreated red mud slurry obtained in the red mud separation step of the Bayer process, even when subjected to several stages of washing in a series of thickeners for removing alkali content, still contains a slight amount of alkali which affords another way of detecting the permeability of compacted bed or layers of the compressed red mud cake. Accordingly, the extent of release of alkali from test bed A above was examined by carrying out an underground water permeation test on bed (A) formed according to the invention with only light compacting pressure. The results are shown in Table 4.

TABLE 4

| Date of sampling | Alkalinity of Underground Water pH | Total $Na_2O$ |
|---|---|---|
| Before formation | 7.10 | 0.42 |
| 10 days after formation | 6.90 | 0.40 |
| 40 days after formation | 6.70 | 0.37 |
| 60 days after formation | 7.15 | 0.40 |
| 90 days after formation | 6.78 | 0.37 |
| 150 days after formation | 6.90 | 0.38 |
| 200 days after formation | 7.05 | 0.40 |

It will be seen from the results in Table 4 that the red mud cake according to the invention forms a sufficiently compact landfill even when the fill is compacted by only very light load (as in A), and has a permeation coefficient of the order of only $10^{-8}$ cm/sec. This means that the permeation property is absent for practical purposes and that there is neither release nor dispersion of alkali from the cake into underground water, which is advantageous from an environmental standpoint.

As has been already described, with the method of forming a landfill from red mud cake bodies which are compressed and dewatered to a void ratio ranging from 1.0 to 1.5, in contrast to prior art attempts at using red mud for land reclamation it is possible to carry out reclamation that is extremely improved in environmental aspects and free from excessive drainage and permeation by ground water. Further, with the load-bearing landfills that can be readily and cheaply formed by very simple means of the invention which are substantially water impermeable and free from permeation and dispersion of the residual alkali contained in the red mud cakes, there is no need for any embankment for preventing washing of red mud slurry and release of alkali. Further, the surface of a landfill constructed from red mud cake of the invention will be hard to crumble into particles when wet with rain, and generation of dust from the surface is drastically reduced.

A grass turf was cultivated by covering the red mud cake landfill according to the invention with ordinary dirt in thicknesses of 5, 10, 15 and 20 cm, and growth of the grass was satisfactory even with a dirt cover thickness of 5 cm. Also, a satisfactory growth of acacia trees was obtained by planting the trees on a landfill of the invention covered with ordinary earth to a thickness of 50 cm. Furthermore, while according to the prior art method, the amount of liquid entrained in the thick slurry discharged from the vacuum filter was about 0.82 $m^3/t$ and for the thickener underflow mud about 2.3–3.7 $m^3/t$, according to the invention, the water content substantially reduced to 0.33 to 0.49 $m^3/t$. Thus, with the invention it is possible to reduce waste alkali and alumina while satisfactorily disposing of the red mud cake by-product of the Bayer process of manufacturing alumina.

Of course, the invention can be applied, in addition to the usual red mud slurry, to slurries which have been subjected to a neutralization treatment with sulfuric acid or the like to eliminate the alkali content.

What is claimed is:

1. In a method of reclaiming land in which a landfill material is deposited to a sufficient thickness over the land to be reclaimed and mechanically compacted, the improvement wherein said landfill material comprises red mud cake obtained by mechanically compressing red mud slurry produced as a by-product in the Bayer process for extracting alumina from bauxite, to a voids ratio in the range of about 1.0–1.5 whereby the red mud cakes require only light compaction to impart thereto a useful density as landfill and the compacted landfill is strongly resistant to disintegration and permeation by rainfall.

2. The method of claim 1, wherein the red mud from the Bayer process is subjected to filtering to reduce its water content before being mechanically compressed to said voids ratio.

3. The method of claim 1, wherein said compressed red mud cake is granulated to facilitate its deposition.

4. The method of claim 1, wherein said compacted red mud cake is covered with a layer of ordinary dirt.

* * * * *